(12) United States Patent
Ballabio et al.

(10) Patent No.: US 10,960,702 B2
(45) Date of Patent: Mar. 30, 2021

(54) DOUBLE METAL SECURITY ELEMENT HAVING TRANSPARENT PATTERN

(71) Applicant: FEDRIGONI S.P.A., Verona (IT)

(72) Inventors: Eligio Ballabio, Pietrasanta (IT); Pasquale Pallotta, Fabriano (IT)

(73) Assignee: FEDRIGONI S.P.A., Verona (IT)

( * ) Notice: Subject to any disclaimer, the term of this patent is extended or adjusted under 35 U.S.C. 154(b) by 0 days.

(21) Appl. No.: 16/483,017

(22) PCT Filed: Feb. 2, 2017

(86) PCT No.: PCT/EP2017/052222
§ 371 (c)(1),
(2) Date: Aug. 1, 2019

(87) PCT Pub. No.: WO2018/141388
PCT Pub. Date: Aug. 9, 2018

(65) Prior Publication Data
US 2020/0016919 A1    Jan. 16, 2020

(51) Int. Cl.
*B42D 25/373* (2014.01)
*B42D 25/328* (2014.01)
(Continued)

(52) U.S. Cl.
CPC ......... *B42D 25/373* (2014.10); *B42D 25/328* (2014.10); *B42D 25/369* (2014.10);
(Continued)

(58) Field of Classification Search
CPC .. B42D 25/373; B42D 25/445; B42D 25/378; B42D 25/328; B42D 25/369;
(Continued)

(56) References Cited

U.S. PATENT DOCUMENTS

| 2008/0310025 A1 | 12/2008 | Staub |
| 2009/0317595 A1 | 12/2009 | Brehm |

(Continued)

FOREIGN PATENT DOCUMENTS

| WO | WO 2008/095698 A1 | 8/2008 |
| WO | WO 2009/109343 A2 | 9/2009 |

(Continued)

OTHER PUBLICATIONS

International Search Report and Written Opinion received in International Patent Application No. PCT/EP2017/052222 dated Oct. 16, 2017.

(Continued)

*Primary Examiner* — Justin V Lewis
(74) *Attorney, Agent, or Firm* — Knobbe Martens Olson and Bear, LLP

(57) ABSTRACT

A security element includes a transparent film, a first layer and a second layer. The first layer includes a first metal arranged on the transparent film in a first pattern. The second layer includes a second metal being a baser metal than the first metal arranged over the first layer in a second pattern. Each of the first and second patterns is composed of metallic regions and metal-free regions. The metal-free regions of the second pattern overlap with the metal-free regions of the first pattern. The metallic regions of the first pattern overlap with the metal-free regions of the second pattern.

17 Claims, 17 Drawing Sheets

(51) Int. Cl.
*B42D 25/369* (2014.01)
*B42D 25/378* (2014.01)
*B42D 25/445* (2014.01)
*G06K 19/06* (2006.01)
*B42D 25/23* (2014.01)
*B42D 25/24* (2014.01)
*B42D 25/29* (2014.01)

(52) U.S. Cl.
CPC ......... *B42D 25/378* (2014.10); *B42D 25/445* (2014.10); *G06K 19/06187* (2013.01); *B42D 25/23* (2014.10); *B42D 25/24* (2014.10); *B42D 25/29* (2014.10)

(58) Field of Classification Search
CPC ........ B42D 25/24; B42D 25/29; B42D 25/23; G06K 19/06187
USPC ........ 283/67, 70, 72, 74, 82, 83, 84, 94, 98, 283/108, 109, 901
See application file for complete search history.

(56) References Cited

U.S. PATENT DOCUMENTS

2012/0025514 A1    2/2012  Camus
2014/0342105 A1    11/2014 Mayrhofer
2016/0375714 A1*   12/2016 Brehm ................... B42D 25/29
                                                        430/15

FOREIGN PATENT DOCUMENTS

WO    WO 2010/015381 A2    2/2010
WO    WO 2014/207165 A1    12/2014

OTHER PUBLICATIONS

Office Action issued in CN application No. 201780084996.0, dated May 20, 2020.

* cited by examiner

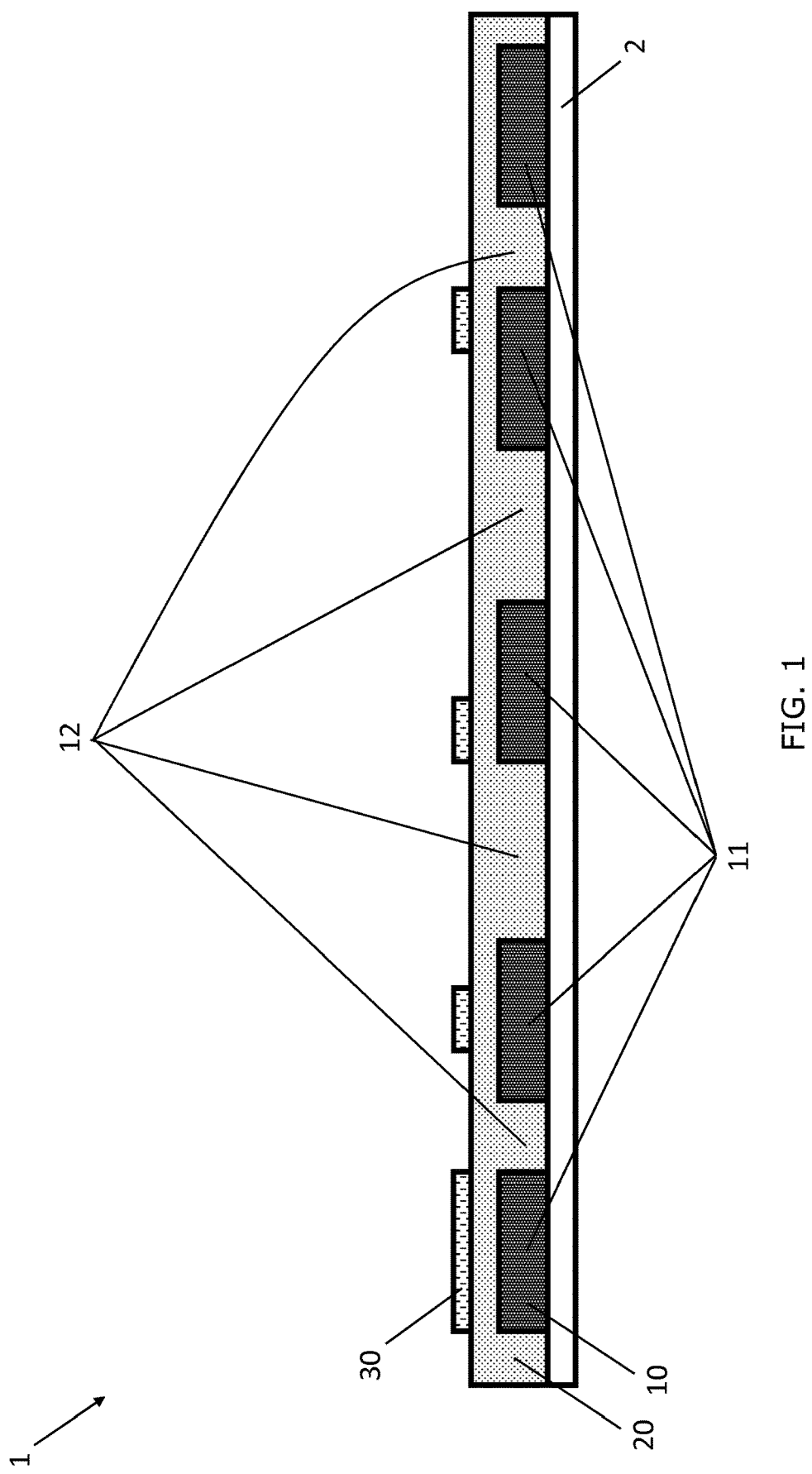

DOUBLE METAL SECURITY ELEMENT HAVING TRANSPARENT PATTERN

BACKGROUND OF THE INVENTION

Field of the Invention

The invention relates to a security element which can have the form of threads, strips or patches and which is used in connection with banknotes, official and nonofficial documents, e.g. like passports, ID-cards, bank and credit cards, checks, papers, coupons, vouchers, tickets, packages or the like. Provision of the mentioned documents with the security element improves the protection against forgery.

Description of the Related Art

Security elements typically have different characteristics or so-called security features which may be recognized by visual inspection, such as color changes, holographic pictures, characters, patterns, which may particularly develop a different appearance according to the angle and direction of the observation with the naked eye. This allows a quick and reliable detection of forgery without requiring any equipment. Therefore, observable effects shall be made prominent in occurrence, so that a missing optical effect is quickly recognized to identify a forgery. Of course, the security element shall be very difficult—if not impossible—to copy, to reduce the potential of forgery.

The formation of patterns, which are visible in transmitted light by providing gaps in a metal layer on a transparent substrate is a readily recognizable security feature and is well known in the art.

SUMMARY OF THE INVENTION

In view of the above, the objective of the invention is to provide a security element, which has an improved safety, and a method for making the same.

This objective is achieved by a security element having the features of claim 1, and by a method having the features of claims 12, 13 and 14, respectively. Advantageous further developments of the present invention are set out in the dependent claims.

According to the invention, a security element, comprises a transparent film, a first layer including a first metal arranged on the transparent film in a first pattern, and a second layer including a second metal being a baser metal than the first metal arranged over the first layer in a second pattern. Each of the first and second patterns is composed of metallic regions and metal-free regions. The metal-free regions of the second pattern overlap with metal-free regions of the first pattern, and metallic regions of the first pattern overlap with metal-free regions of the second pattern.

The invention provides a security element having at least two security features which are visually recognizable with the naked eye. One of these security features is a pattern, which is recognizable in transmission, i.e. light transmitted through the security element. In brief, a person holding the security into the light and observing the side of the security element which is turned away from the light source will see a pattern which is made up from the metal-free (transparent) regions which appear lit in a dark (opaque) surface formed by the metallic regions. This effect will be obtained independently from the side, which is exposed to the light source, is clearly recognizable (observable) in transmitted light, and forms a first safety feature of the security element.

Furthermore, when the security element is observed in reflected light (i.e. the observer and the light source are on the same side of the security element) the side carrying the first and second layer will show characters, patterns or pictures formed by the two layers, which have a different appearance due to the different metallic materials from which they are formed. Depending on the angle of observation, the light conditions, and the specific metals constituting the first and the second layer, both layers might blur into one pattern, i.e. become indistinct, or appear sharply distinct from each other, i.e. show bicolored characters, patterns or pictures.

In an advantageous modification of the invention, the second layer is arranged upon the first layer. This structure simplifies the manufacturing of the security element and improves the strength thereof, since the metallic layers adhere to each other.

Preferably, at least one of said first and second layers has a holographic surface structure. This can be achieved by covering a suitably structured or modulated surface of the respective layer with a reflective layer—e.g. with one of the above metals—, which provides the holographic effect such as changing pictures and/or colors and/or 3D-pictures and the like depending on the direction of observation. With this structure, visual inspection of the security element in transmitted light will disclose the pattern constituted by the alternating metallic regions and metal-free regions, which is observable from both sides of the security element. On the other hand, visual inspection from one side of the security element in reflected light will show a holographic effect. As a result a further security feature can be added to the security element.

More preferably, at least one transparent layer is interposed between at least the metallic regions of the first layer and the transparent film. Additionally, the at least one transparent layer and the side of the first layer facing the transparent layer have a holographic surface structure. As a result, the holographic effect is also observable from the other side of the security element in reflected light. Further, this effect might differ depending on the observed side, i.e. the front surface (one side) or the rear surface (other side), of the security element.

In a further advantageous modification of the invention, at least parts of one or of both of the first and second layers are covered by a color changing layer. This adds an even further security feature that is visible in reflected light to the security element.

More preferably, the security element further comprises an even further security feature consisting of a magnetic material preferably in the metallic regions of the patterns or in a separate magnetic layer which constitutes a machine readable information carrier.

Even more preferably, an insulating layer is interposed between the first and the second layer that electrically insulates the layers from each other. The insulation layer prevents contact corrosion (galvanic corrosion) due to different normal potential (standard potential) of the different metals of the first and the second layer.

In an even further advantageous modification, a clear coating is provided in at least a part of at least one of the first and second layers, the color changing layer, and the magnetic layer. The clear coating comprises materials having at least one of a fluorescent, a luminescent, and phosphorescent effect, thus adding another security feature to the security element.

Advantageously, by providing the at least one transparent layer being interposed between at least the metallic regions of the first layer and the transparent film, all additional security features described above can also be observable from the rear side (other side) of the security element, if the at least one transparent layer is at least one of a color changing layer, a magnetic layer, and a layer comprising at least one of a fluorescent, a luminescent, and phosphorescent effect. Thus, the variation possibilities, i.e. the possible combinations of the security features are multiplied even further.

Preferably, the security element is provided with a protective layer covering at least a part of the exposed outermost surface portions of at least one of the first and second layers, the clear coating, the magnetic layer, and the color changing layer.

Generally, the security element shall be resistant to environmental conditions, such as solar irradiation, liquids and gases, and variations in temperature, as well as to excessively wearing usage due to folding, crumpling, rubbing and tearing over long periods of time. By selecting different materials or compositions to be used as the protective layer, the lifetime of the security element can be significantly increased.

The transparent film on which the first layer is formed is preferably made from a PET (polyethylene terephthalate) film which has a high transparency and which is stable in shape and is sturdy.

The general concept of a manufacturing method of the security element comprises the steps of providing the transparent film; forming the first layer including the first metal on the transparent film having the first pattern of metallic regions and metal-free regions; forming the second layer of the second metal being a baser metal than the first metal over the first layer; forming a layer of a transparent mask on a part of the second layer; and removing the part of the second layer that is not protected by the transparent mask by a de-metallization process to which the baser metal is more susceptible than the nobler first metal.

Alternatively, the method for manufacturing comprises the steps of providing a transparent film; applying a release agent on parts of the transparent film; coating the transparent film and the release agent with a first metal; removing the first metal being coated on the release agent so as to form a first layer on the transparent film having a first pattern of metallic regions and metal-free regions; coating a second metal being a baser metal than the first metal over the first metal and the release agent; removing the second metal being coated on the release agent so as to form a second layer over the first layer having a second pattern of metallic regions and metal-free regions; forming a layer of a transparent mask on a part of the second layer; and removing the part of the second layer that is not protected by the transparent mask by a de-metallization process to which the baser metal is more susceptible than the nobler first metal.

As a further alternative, the method for manufacturing the security element comprises the steps of providing a transparent film; forming a first layer including a first metal on the transparent film having a first pattern of metallic regions and metal-free regions; forming a second layer of a second metal being a baser metal than the first metal over the first layer; forming a layer of a transparent mask on a part of the second layer; and removing the part of the second layer that is not protected by the transparent mask by a de-metallization process to which the baser metal is more susceptible than the nobler first metal. The second layer can be formed by the steps of applying a transparent radiation-curing coat being metal repellent on at least parts of the first layer; exposing the coat through the transparent film to radiation using the first pattern as a mask; removing the non-cured part of the radiation-curing coat from the security element; coating the second metal over the first layer and the metal repellent coat; and removing the part of the second metal being repelled by the metal repellent coat. Alternatively, the second layer can be formed by the steps of applying a transparent radiation-resolvable coat on at least parts of the first layer; coating the second metal over the first layer and the radiation-resolvable coat; exposing the coat through the transparent film to radiation using the first pattern as a mask; and removing the resolved part of the radiation-resolvable coat and the second metal bound thereto from the security element.

The above manufacturing methods a capable of providing the security element according to the invention and provide great flexibility of the manufacturing process. Depending on the materials that are used to manufacture the security element, on the desired properties and quality of the security element, the appropriate method can be chosen under consideration of expenditure in manufacturing.

Preferably, each of the manufacturing methods comprises at least one of the steps of forming at least one of a transparent layer, a color changing layer, a magnetic layer, and a layer of clear coating comprising materials having at least one of a fluorescent, a luminescent, and phosphorescent effect prior to forming the first layer; forming a holographic surface structure on the at least one transparent layer and the side of the first layer facing said transparent layer (second side/lower side of the first layer); forming an electrically insulating layer after the formation of the first layer and prior to the formation of the second layer; forming a magnetic pattern or layer on at least one of the first and second layers; forming a color changing layer on at least one of the first and second layers, and the magnetic pattern or layer; forming a clear coating upon at least a part of at least one of the first and second layers, the clear coating comprising materials having at least one of a fluorescent, a luminescent, and phosphorescent effect; and forming a protective layer on at least a part of the exposed outermost surface portions of at least one of the first and second layers, the magnetic pattern or layer, the color changing layer, and the clear coating.

Thus, a preferred security element according to the invention can be achieved. The security element comprises at least two of a wide range of different security features and therefore has an improved safety.

BRIEF DESCRIPTION OF THE DRAWINGS

In the following, the invention will be explained in detail with reference to the drawings, in which FIG. 1 is a sectional view of a schematic intermediate structure of a security element during a manufacturing process of the security element according to the invention.

DETAILED DESCRIPTION OF THE PREFERRED EMBODIMENT

In the description of the drawings, the terms upper and lower, above, underneath etc. are used in relation to the drawings as shown. The first direction is the direction from the lower part of the drawings to the upper part thereof, i.e. the manufacturing direction of the security element, while the second direction is the direction opposite to the first direction. These terms are not limiting, because an opposite orientation of the security element during manufacturing and use is possible and likely, so that these terms will have to be adapted accordingly. Also, terms like first, second and third or the like are derived from the order of manufacturing, and are not limiting the scope of the claims, when counting the order of layers in the final product.

The figures are schematic enlarged sectional views of a portion of a security element according to the present invention. It is noted that the size relations of the individual elements are drawn arbitrarily for explanation purpose and do not correspond to the natural size relations. Further, additional layers, which are not shown in each figure, can be provided on, between, or under the layers shown in the figures in order to support the manufacturing of the security element or to improve safety or other properties, such as durability, of the security element as long as such a layer arrangement is technically feasible. It should be noted, that omission of specific layers in the figures is only due to simplicity of the explanation of the invention and due to the lucidity of the drawings. However, this omission should not be interpreted as limiting the subject-matter of the present invention.

Figure 2A:
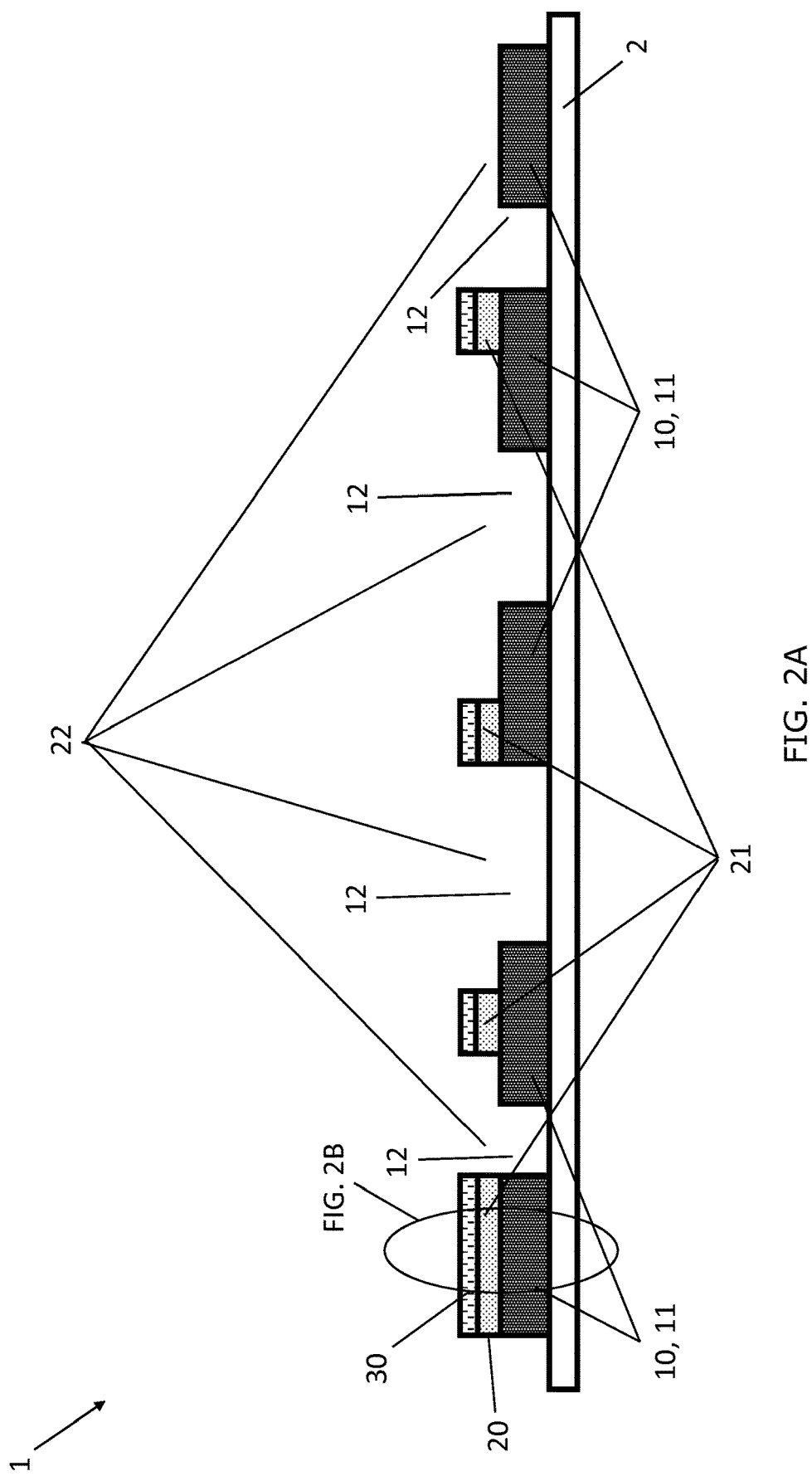
FIG. 2A is a sectional view of a schematic final structure of the security element during the manufacturing process of the security element shown in FIG. 1 according to the invention.

FIGS. 1 and 2A show the general concept of the manufacturing process of the security element 1 according to the invention. Starting out from FIG. 1, there is provided a transparent film 2 made preferably from PET, which is used as a carrier for the security element 1. In an exemplary second step, a first layer 10 made of metal is provided selectively on the transparent film 2 by printing, vapor deposition, electrolytic and chemical deposition or the like. Alternatively, local de-metallization forming metal-free regions 12 can be used. The first layer 10 can be composed of copper (Cu) or a copper-based alloy, for example, which will be referred to as first metal. By selectively applying the metal to the transparent film 2, metallic regions 11 are formed thereon. Between these metallic regions 11, i.e. in the regions of the transparent film 2 not covered by the first metal, metal-free regions 12 are formed. The metallic regions 11 and the metal-free regions 12 are arranged in an alternating manner in the plane of the first layer 10, i.e. in the width and longitudinal direction of the security element 1, to form a first pattern.

As a next exemplary step, a second layer 20 also made of metal is provided on the first layer 10. The second layer 20 can be composed of aluminum (Al) or an aluminum-based alloy, for example, which will be referred to as second metal. In this stage of the manufacturing process the second layer 20 is a continuous layer completely covering the first layer 10. The second layer 20 can be coated on the first layer 10 so as to have a non-uniform thickness as shown in FIG. 1, i.e. so as to be thicker in the regions above the metal free regions 12 of the first layer 10 and to be thinner in the regions above the metallic regions 11 of the first layer 10. Alternatively, the second layer 20 can be laid on the first layer 10 as a preferably thin film having a uniform thickness. The second layer can be applied by printing or by a metallization process, wherein one possible process uses evaporation of the metal in vacuum.

Subsequently, in a further exemplary step of the manufacturing process, a transparent mask 30 is selectively applied to the second layer 20. The transparent mask 30 is composed of one or more materials or compositions, which are resistant to acids or similar agents capable of dissolving and removing particularly the second metal. The transparent mask 30 is resistant against metal dissolving/removing liquids (etching liquids) and is capable to protect the metal layer underneath against such etching liquids. In the following description of the methods for manufacturing the security element, the transparent mask 30 is defined as being made of a coating, i.e. it may comprise any suitable coating material such as lacquer, ink, varnish, resist, or other solidifying spreadable materials.

In a subsequent exemplary step, the intermediate product is exposed to the acid or similar agent, for example by being dipped into an acid bath.

Since the first metal is a nobler metal than the second metal, i.e. the first metal has a higher normal potential (standard potential), parts of the second layer 20 which are not covered and protected by the protective transparent mask 30 are removed without substantially affecting the first layer 10. As a matter of course, this requires a precise timing depending on the kind of metals, the thickness and the coverage (surface density) of the first and second layer 10, 20, the properties of the de-metallizing substance and the ambience conditions.

FIG. 2A shows the final structure of the security element 1 according to the present invention. As can be seen from this figure, in the washing or etching step, those portions of the second layer 20 which were not covered by the transparent mask 30, are dissolved and removed to form the second pattern in the desired shape. The regions of the second layer 20 which are covered by the transparent mask 30 are shielded and are unaffected by the washing or etching liquid and remain substantially unchanged by the de-metallization process. From the figure one can clearly see that the de-metallized regions or portions of the first metal layer 10, where the metal has been removed, i.e. the metal-free regions 12, are in conformity or register with the gaps formed in the superimposed second metal layer 20, i.e. with the metal-free regions 22. As a result, when the pattern is observed in transmitted light from either side of the security element a clear and bright pattern can be recognized. The metallic regions 11 and the metal-free regions 12 are arranged so as to form pictures, characters or patterns, which are recognizable from below, i.e. when looking at the security element in the first direction, in reflected light. Then, the first layer 10 appears preferably mirror-inverted. On the other hand, when observing the security element 1 from above, i.e. in the second direction, in reflected light, the metallic regions 11 and the metal free regions 12 of the first layer 10 together with the metallic regions 21 and the metal free regions 22 of the second layer 20 form different or at least differently colored pictures, characters or patterns. This difference forms a security feature, which is easily recognizable with the naked eye.

In the following, an exemplary structure of the security element 1 according to the invention will be explained using FIG. 2B, which is a quasi (virtually) exploded enlarged sectional view in which a more detailed structure of the selected region shown in FIG. 2A is depicted. It is to be noted that the gaps between the layers of FIG. 2B are shown for presentation and explanation purposes and that the multiple layers of the security element 1 are continuously connected or adhering to each other without any gaps therebetween.

Figure 2B:
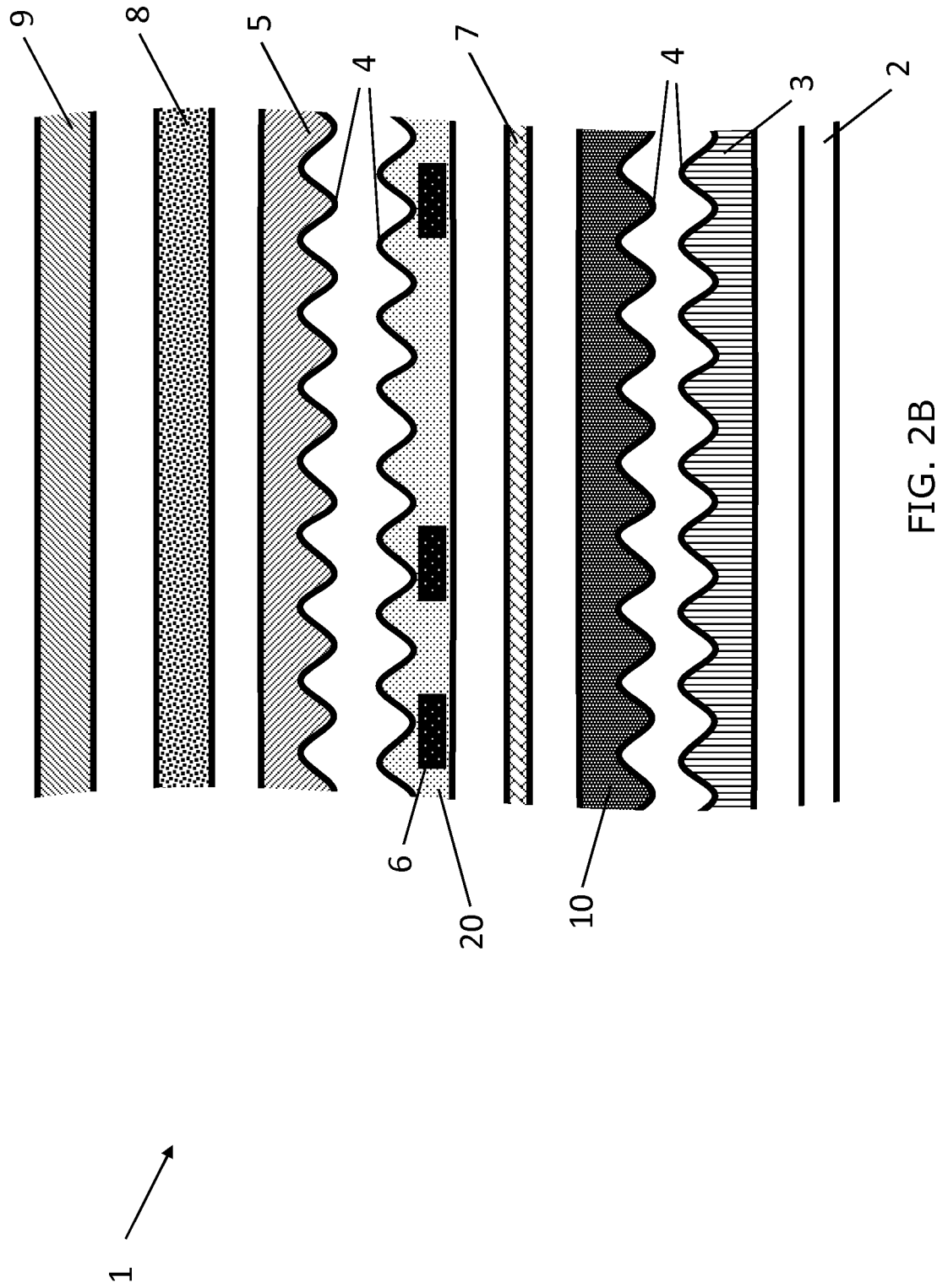
FIG. 2B is an exploded enlarged sectional view showing an exemplary structure of a security element according to the invention.

It is to be understood, that the composition of different layers as shown in FIG. 2B varies depending on the purpose of the security element 1, i.e. on the desired effects (security features) to be achieved. The manufacturing steps of these various layers have to precede, to be interposed or follow the manufacturing steps as outlined above with reference to FIG. 1 and FIG. 2A.

The exemplary sequence of the layers in the manufacturing direction of the security element 1, i.e. the first direction, is the transparent film 2; a transparent layer 3; a holographic surface structure 4 of the transparent layer 3; a holographic surface structure 4 of the first layer 10 corresponding to the holographic surface structure 4 of the transparent layer 3; the first layer 10; an insulating layer 7; the second layer 20 comprising metallic material 6; a holographic surface structure 4 of the second layer 20; a holographic surface structure 4 of a color changing layer 5 which corresponds to the holographic surface structure 4 of the second layer 20; the color changing layer 5; a clear coating 8; and a protective layer 9.

The transparent film 2 made preferably from PET carries the transparent layer 3. The surface structure 4, which is formed on the upper surface of the transparent layer 3 is embossed into the material of the layer. The surface structure is suited to form a holographic picture or effect. In the drawing of FIG. 2B line 4 is used to express an irregular or rough surface structure, which in practice has much smaller amplitudes then is shown here.

Above the transparent layer 3 there are portions of the first layer 10, wherein the first layer 10 follows the surface structure 4 of the transparent layer 3. Advantageously, the materials used for the first layer 10 and for the second layer 20 are embossable materials and the holographic surface structures 4 are made by embossing the respective layer. That is, since the first layer 10 is thin and has an almost constant thickness in the metallic regions 11, it repeats the surface structure 4 of the transparent layer 3 accurately.

Between the first layer 10 and the second layer 20 there is an insulating layer 7. The insulating layer 7 is interposed between the first and the second layer 10, 20 so as to prevent electrical (electrochemical) connection between the layers, i.e. the insulating layer 7 is for electrically insulating the layers from each other. As a consequence, contact corrosion due to the different normal potentials (standard potential) can be inhibited from occurring. Therefore, the freedom of choice of the materials for the metallic layer and the magnetic layer or coding is larger. Furthermore, the lifetime of the security element 1 is improved. Preferably, flexible (non-brittle) materials are used as an insulating medium, such as (synthetic) resins. This maintains the strong connection between the metals of the different layers.

In the shown example, the security element 1 further comprises a magnetic material 6 in the non-transparent regions of the pattern of the second layer 20, i.e. in the metallic regions 21 thereof, or in a separate magnetic layer (not shown), forming a machine readable information carrier or a so-called magnetic coding. The provision of magnetic materials to form the coding, which is machine-readable, is an additional security feature, which may be combined with the security element 1 as described above. Since the magnetic material 6 is typically non-transparent, it is advantageously arranged in the non-transparent regions of the security element 1, e.g. in the metallic regions 11 of the first layer 10. This has the advantage that the magnetic coding will not interfere with the appearance of the security element 1 obtained in transmitted light, and, as a further advantage, the magnetic coding may be hidden in connection with the non-transparent regions, so that the coding may not be recognized when visually inspecting the security element 1.

The magnetic material 6 can be provided in a separate layer and a further insulating layer is interposed between this magnetic layer and the adjacent first and/or second layer 10, 20. A particular advantage of this situation is similar to the above insulating layer 7 and is seen in the galvanic separation between the materials of the metallic layer and the magnetic layer or coding. Due to this separation, the formation of any local element, which may cause contact corrosion, is securely avoided. Therefore, the freedom of choice of the materials for the metallic layer and the magnetic layer or coding is larger. Furthermore, the lifetime of the security element 1 is improved.

Alternatively, one layer, e.g. the second layer 20, comprises a magnetic pattern of magnetic materials which is formed from blocks of a first magnetic material 6, gaps, and blocks of a different magnetic material (not shown). The gaps and materials of the magnetic pattern form a magnetic coding as a security feature, which can be detected by suitable equipment. In order to make the magnetic pattern or coding invisible, the blocks, of the magnetic material are arranged in the non-transparent regions of the second layer 20, i.e. in the metallic regions 21 thereof, so that they cannot be observed in transmitted light. Additionally, the blocks of the magnetic coding can be made from a dark material similar as the metal constituting the second layer 20.

The magnetic coding may consist of magnetic inks containing materials which have different coercivity, so as to provide further pieces of information in the magnetic code which can be observed by suitably magnetizing/demagnetizing of the security element 1 and observing the magnetic response.

The color changing layer 5 comprises at least one of a liquid crystal polymer, a thin film and a pigment ink. Any of these types of materials provide a color changing effect, which means that the color of the portion of the security element 1, which is observed, changes its color depending on the angle of observation of that portion of the security element 1. Typically, the span of the change in wavelength of the reflected light depending on the angle of observation—which exhibits the color changing effect—is different for the individual materials, but is almost a constant span for the individual material. That means, suitably selecting the span of wavelength change within a spectrum of light can generate a desired color change from one predetermined color to another. Liquid crystal polymer is known for a strong color changing effect and easy application, so that this material may be preferred, if these features are requested.

Advantageously, the non-transparent regions of the pattern underneath the color changing layer 5 have a dark color. With the dark color, the amount of light reflected by the non-transparent regions becomes low when inspecting the security element 1 in reflected light, where the observer and the light source are on the same side of the security element 1, so that the wavelength selective reflection of light according to the angle of observation becomes dominant. This results in that the color change is visible more clearly. Also, because there is almost no reflected light from the dark colored regions, the effect is similar as to the transparent regions, which also do not reflect the light. Therefore, the layer of color changing materials exhibits a continuous appearance in which the patterns of transparent and non-transparent regions are invisible.

In a further variation, subsequent layers, e.g. the color changing layer 5, being arranged above the layer containing the magnetic pattern cover the non-transparent regions and the magnetic material blocks. In this case, only the reflected light on the surface of the color changing layer 5 can be observed, because the light penetrating into the color changing layer 5 will be absorbed or will pass through the transparent regions of the patterns, so that the observer cannot differentiate between transparent and non-transparent regions and the magnetic coding is hidden under the color changing layer 5.

In addition, a clear coating 8 may be provided in the transparent regions of at least one of the patterns, or such clear coating 8 may completely cover at least one of the two patterns. The clear coating 6 may have only protection purpose, that is, it fills the gaps in the metal layers to provide a smooth surface, which has an improved resistance. In an advantageous modification of this, the clear coating 8 may contain materials, which have at least one of a fluorescent, a luminescent, and phosphorescent effect. In this way, a further security feature may be added to the security element 1. When the optically active (fluorescent, luminescent, phosphorescent) coating is provided only on one side of the security element 1, then the optical effect may be observed in the transparent regions of the pattern, when the suitable radiation (e.g. UV-light) is radiated on the side where the coating is applied and which is opposite to the observer (transmitted light) while the pattern may disappear when the radiation is applied on the side which carries the coating. For example, when using a fluorescent coating, signs or the like in the pattern may appear illuminated on the side of the observer which is opposite to the side on which the fluorescent coating is applied, when the security element 1 is observed in transmitted UV-light.

Moreover, a transparent protective layer 9 may be applied to cover the security element 1. The protective layer 9 forms a cover to seal the layered structure of the security element 1. This may be obtained by printing a protection lacquer on the security element. The protective layer 9 is suitably selected to be resistant against e.g. mechanical wear, radiation, chemical substances which may expectably come into contact with the security element and the like. The protective layer 9 is applied to cover the exposed surfaces of the layers and to fill gaps formed in the layers, particularly the gaps formed by the transparent regions of the patterns. In this way, the surface of the security element 1 becomes smooth, so that intrusion of liquids or debris is avoided and resistance to mechanical wear at the edges of the gaps is inhibited. This ensures a clear appearance of the security features of the security element 1 over long time.

Advantageously, the protective layer 9 is provided with an adhesive, preferably a thermo-adhesive. In this way, application of the security element to a carrier (banknote or the like) is possible by the application of heat and pressure. In this case, the side of the security element 1 covered by the protective layer is fixed to the carrier, so that the exposed surface of the security element 1 is the transparent film, which may be made of PET, a robust material.

As described above, the layers presented in FIG. 2B can be combined as needed, in order to provide various security features.

In the following, a manufacturing process of the security element 1 according to the present invention will be described with reference to FIGS. 3 to 6. Elements of the security element 1 corresponding to the elements described in connection with FIGS. 1, 2A and 2B are denoted with the same reference signs and their description will be omitted in so far as to avoid redundancies for the sake of curtness of the description.

Figure 3:
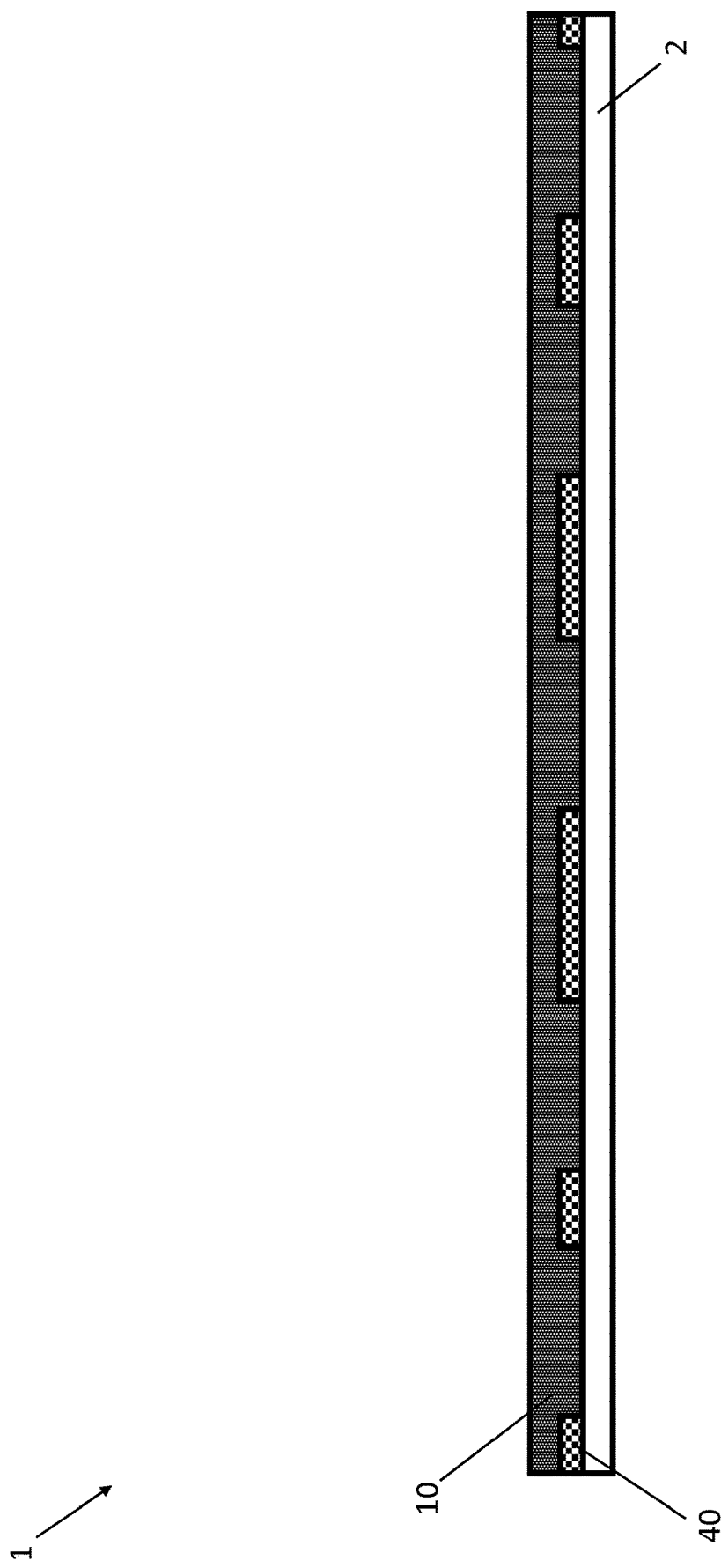
FIGS. 3 to 5 are sectional views of schematic intermediate structures of a security element during another manufacturing process of the security element according to the invention.

FIG. 3 shows the transparent film 2 on which a release agent 40 is selectively applied, which is preferably transparent, either directly or with further layers interposed between the transparent film 2 and the release agent 40. The first layer 10 is then coated on the release agent 40 and on the transparent film 2. The first layer 10 can be coated so as to have a uniform thickness (not shown) or so as to have a different thickness in the regions where it covers the release agent 40 and the regions where it directly contacts the transparent film 2 or a further layer. In a further step, the parts of the first layer 10, which are covering the release agent 40 and are not able to adhere thereto, are removed by a suitable chemical, physical or mechanical process.

Figure 4:
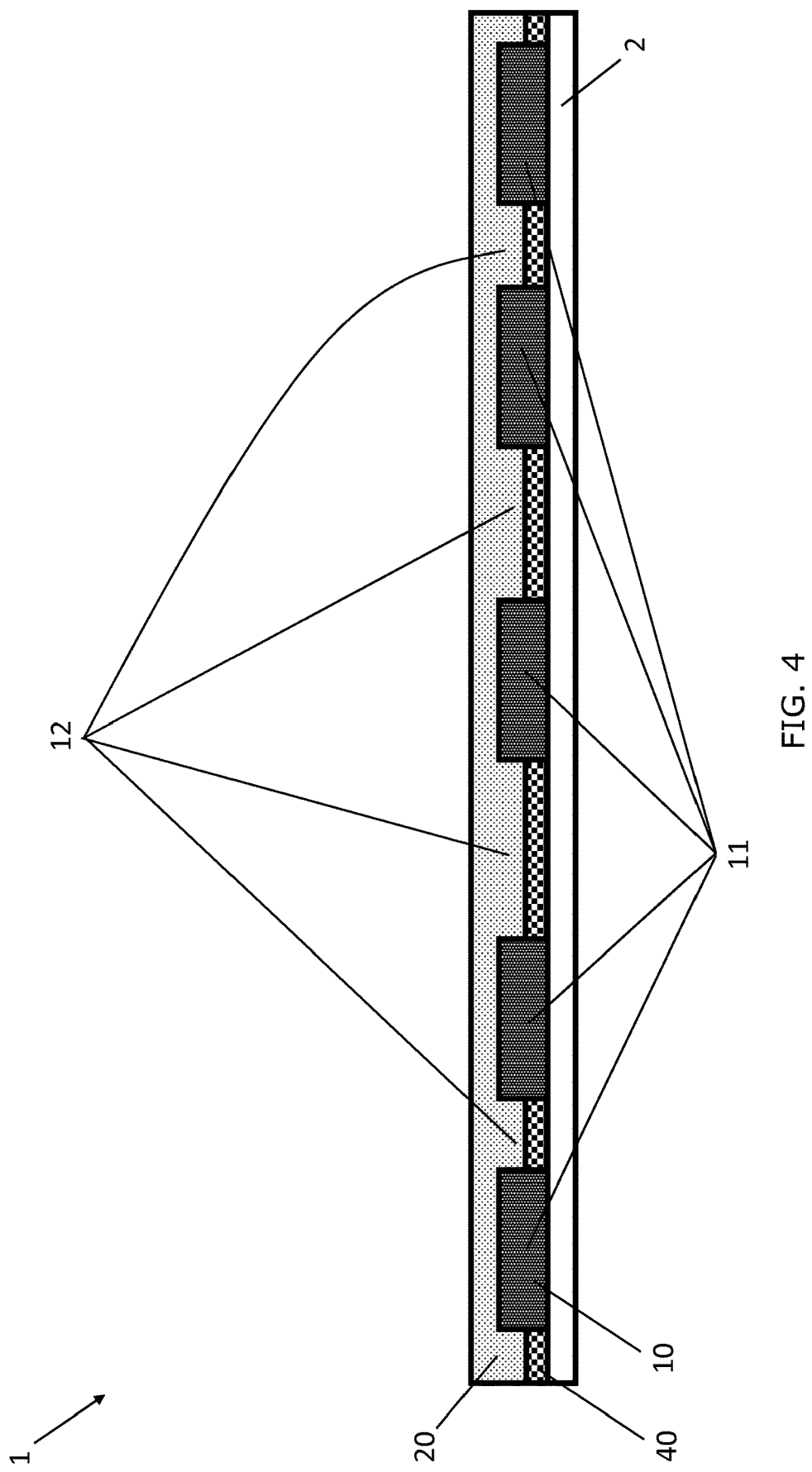
Figure 5:
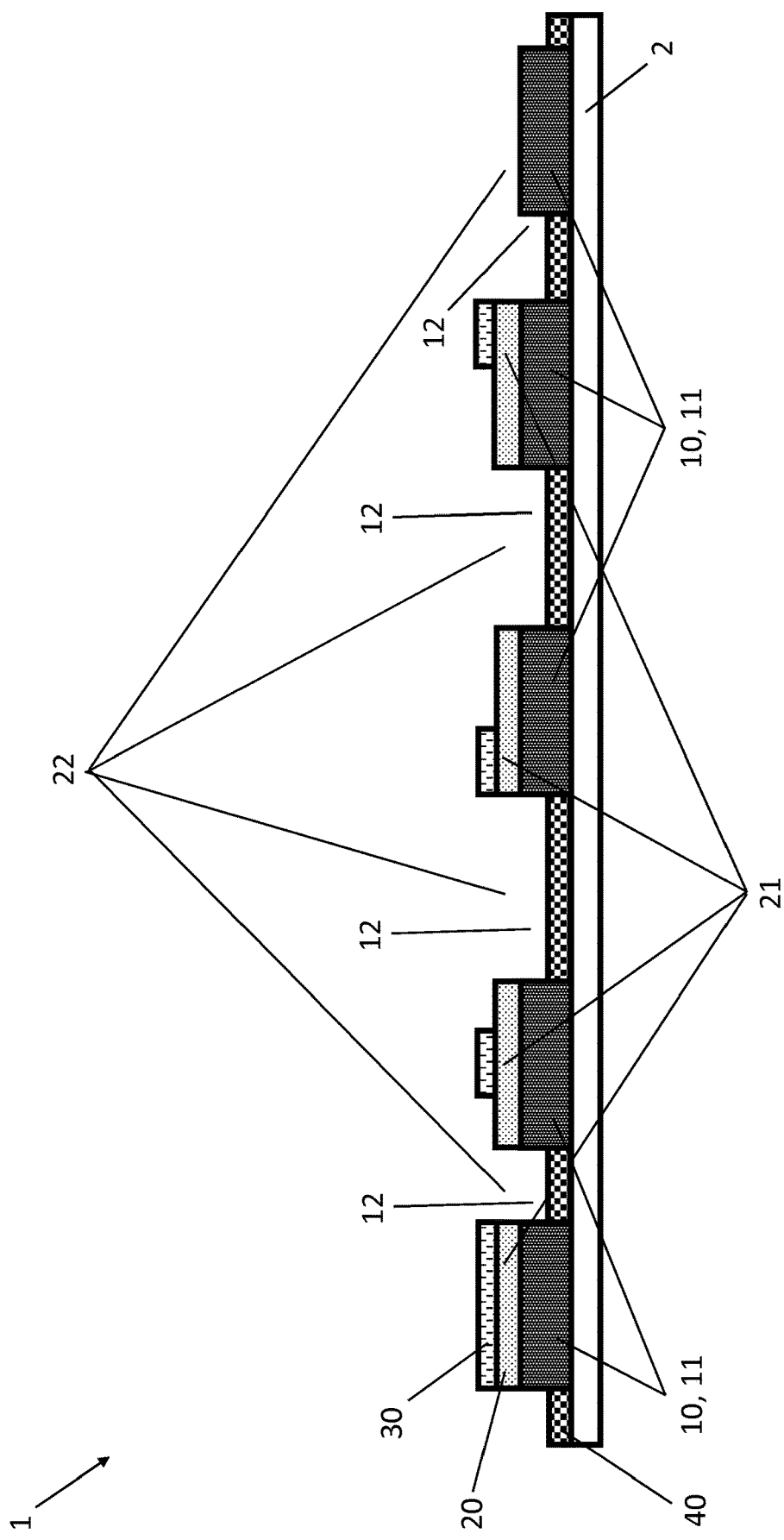

As a result, the first layer 10 includes metallic regions 11 being in direct contact with the transparent film 2, as can be seen in FIG. 4, or one of the layers described above interposed therebetween (not shown). The metallic regions 11 are formed in the parts of the intermediate security element 1, which were previously not covered by the release agent 40. On the other hand, there are metal free regions 12, which are formed above the selectively coated release agent 40. The metallic regions 11 and the metal free regions 12 together form the first pattern of the first layer 10. In a further exemplary step, the second layer 20 can be coated on the underlying layers in a similar manner as the first layer 10 has been coated previously. Then, the parts of the second layer not adhering to the underlying layers due to the release agent 40 are removed in a process that is similar to the removal of the first layer 10. The result is shown in FIG. 5, where metallic regions 21 and metal free regions 22 are arranged to form the second pattern of the second layer 20.

Figure 6:
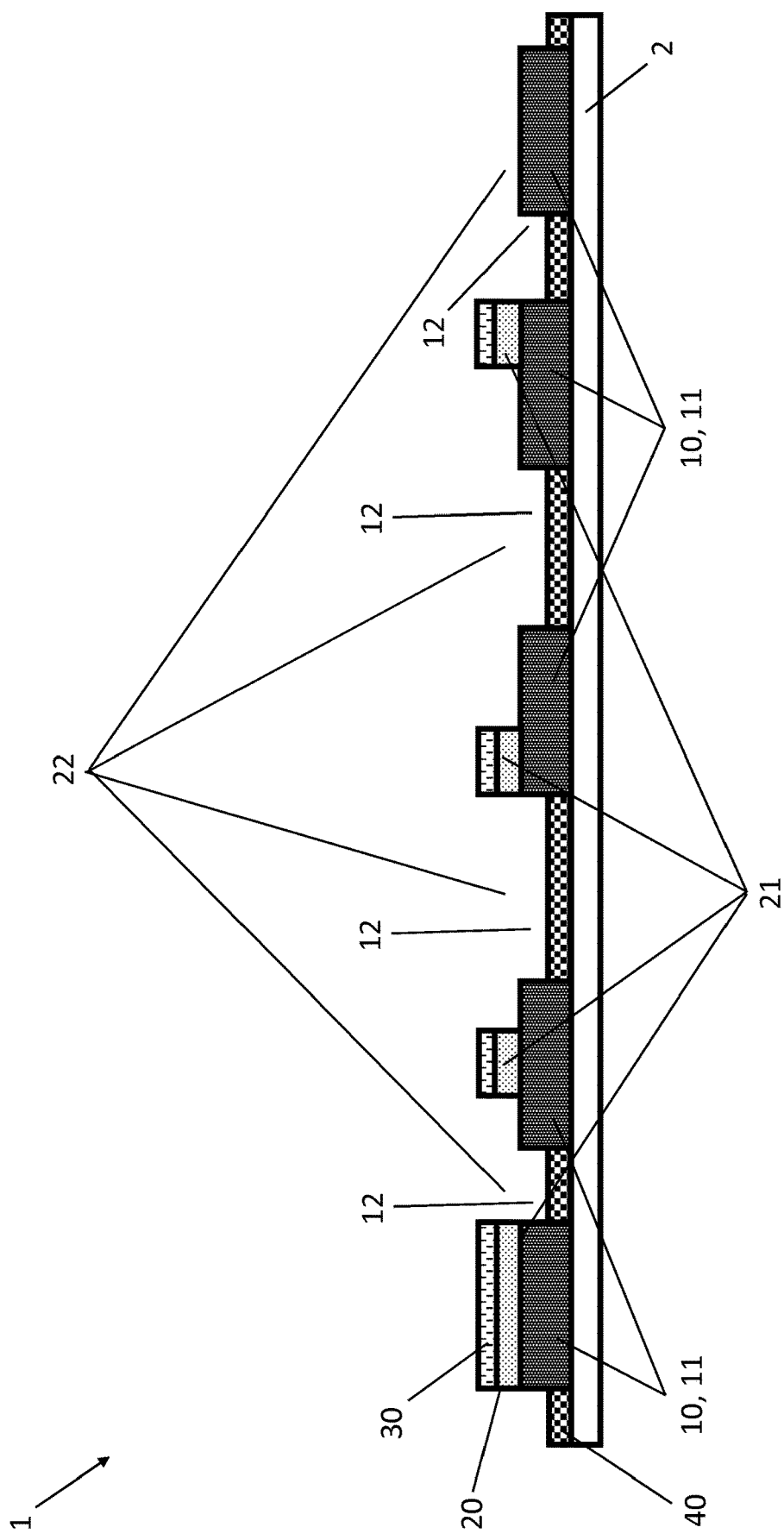
FIG. 6 is a sectional view of a schematic final structure of the security element during the manufacturing process of the security element shown in FIGS. 3 to 5 according to the invention.

Thereafter, as has been described above in connection with FIG. 1, a transparent mask 30 can be selectively applied to the second layer 20. Then the parts of the second layer 20, which are not shielded by the transparent mask 30 are removed so that the remaining metallic regions 21 and metal-free regions 22, i.e. second pattern of the second layer 20, correspond(s) to the selectively coated transparent mask 30 as shown in FIG. 6. This figure depicts the final structure of the security element 1 only schematically. Further layers, as discussed in connection with FIG. 2B, could be added to the security element 1.

A further manufacturing process of the security element 1 according to the invention will be described referring to FIGS. 7A to 7E.

Figure 7A:
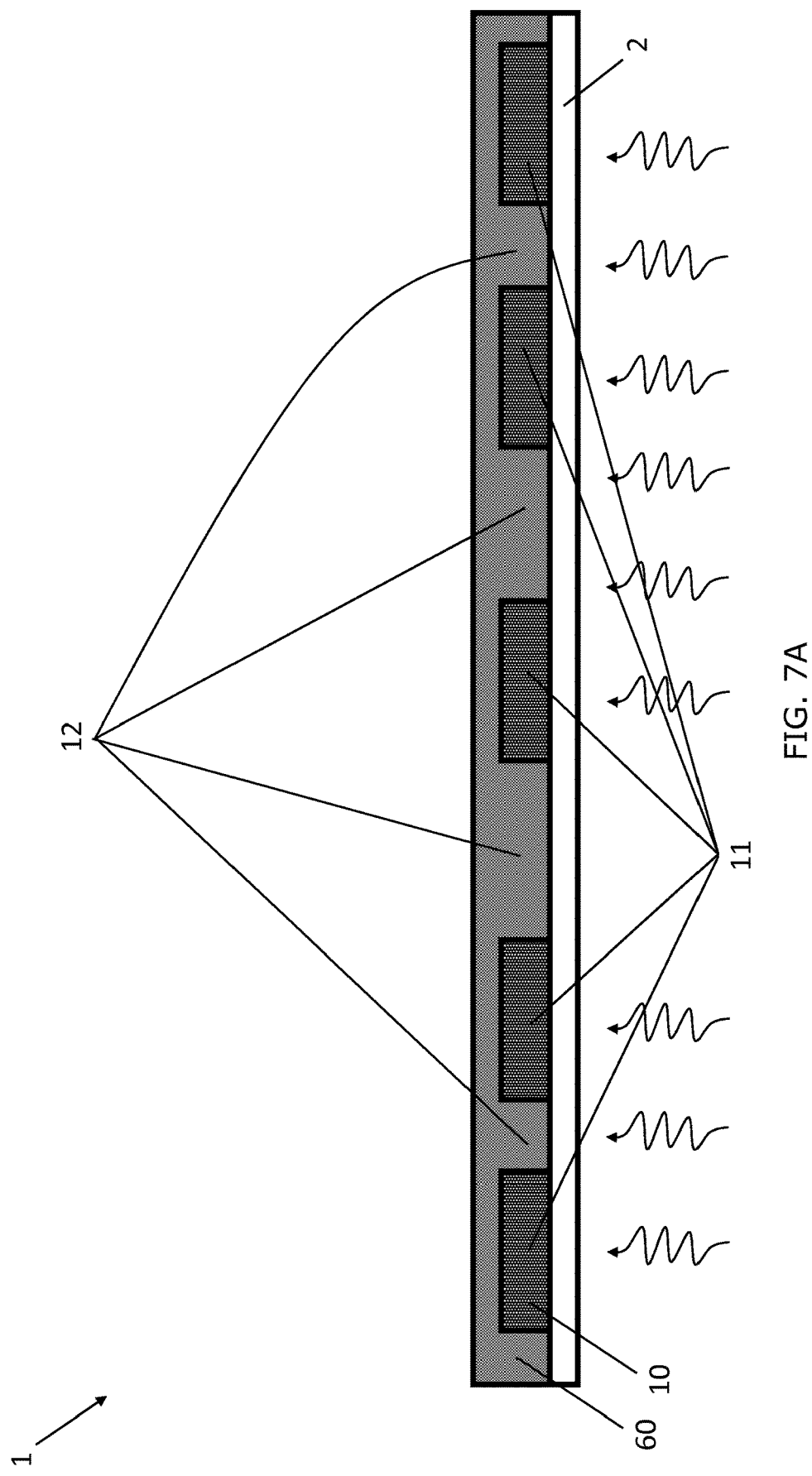
FIGS. 7A to 7D are sectional views of schematic intermediate structures of a security element during a further manufacturing process of the security element according to the invention.

In an exemplary first step, the first layer 20 is coated on the transparent film 2 either directly or with other layers interposed therebetween. The application of the first layer can be done either selectively or by using the release agent 40, as has been set out above. Subsequently, a radiation-curing coat 60 is applied to the intermediate security element 1. The coat 60 is curable when being irradiated with a specific radiation, preferably UV-light, X-rays or light from the visible spectrum. At least in the cured state, the coat 60 is transparent and metal-repellent. When the photo-sensitive material of the radiation-curing coat 60 is irradiated with UV-light or the like, it changes its composition such that the irradiated material portions become solid. As an exemplary following step, the intermediate security element 1 is irradiated with the specific radiation, to which the radiation-curing coat 60 is susceptible so as to set, using the first layer 10, specifically the metallic regions 11 thereof, as a mask. As shown in FIG. 7A, the source of radiation is below the intermediate security element 1 so that the radiation is emitted substantially in the first direction. The radiation-curing coat 60 being applied to the metal-free regions 12 of the first layer 10 is directly exposed to the radiation, thus hardening, while the radiation-curing coat 60 being hidden from the radiation behind the metallic regions 11 of the first layer 10 remains unchanged.

Figure 7B:
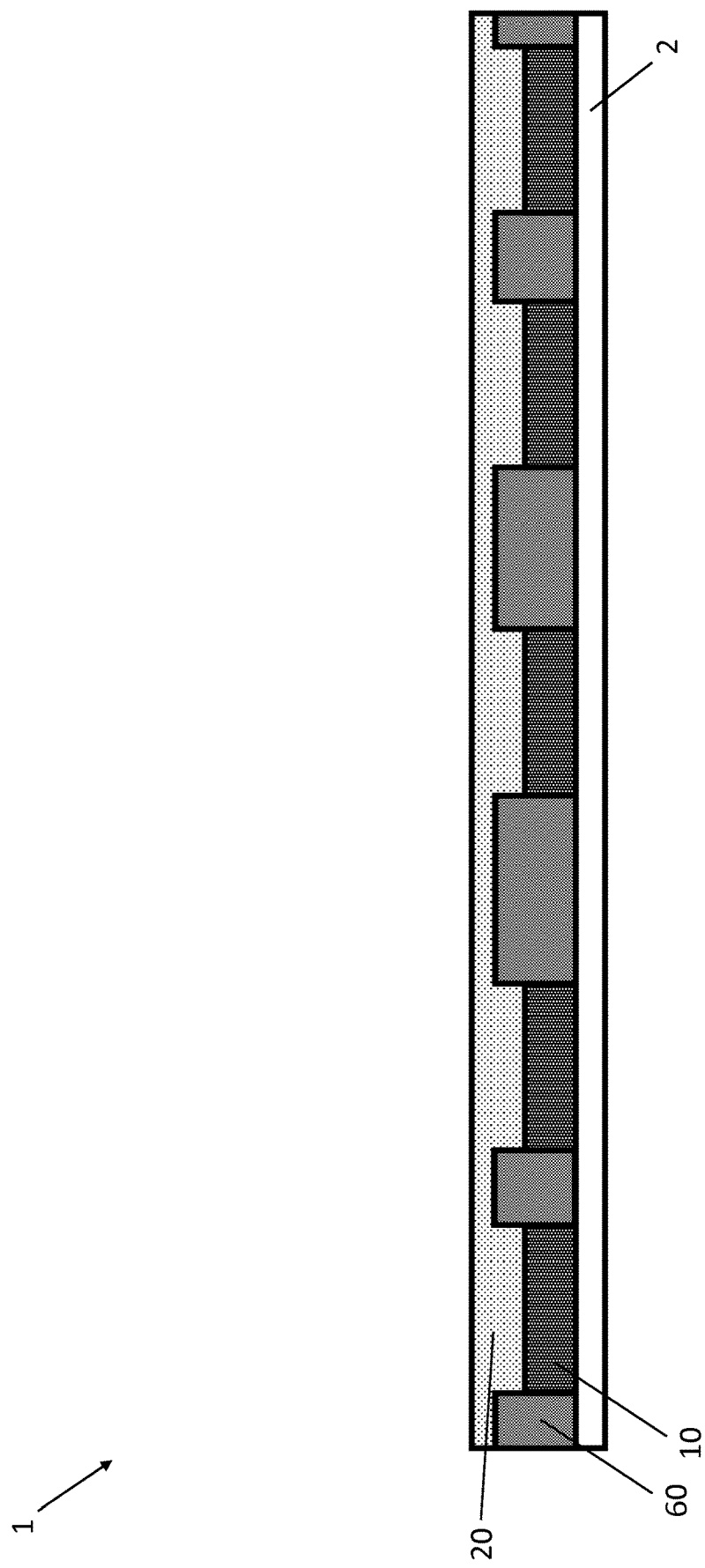
Figure 7C:
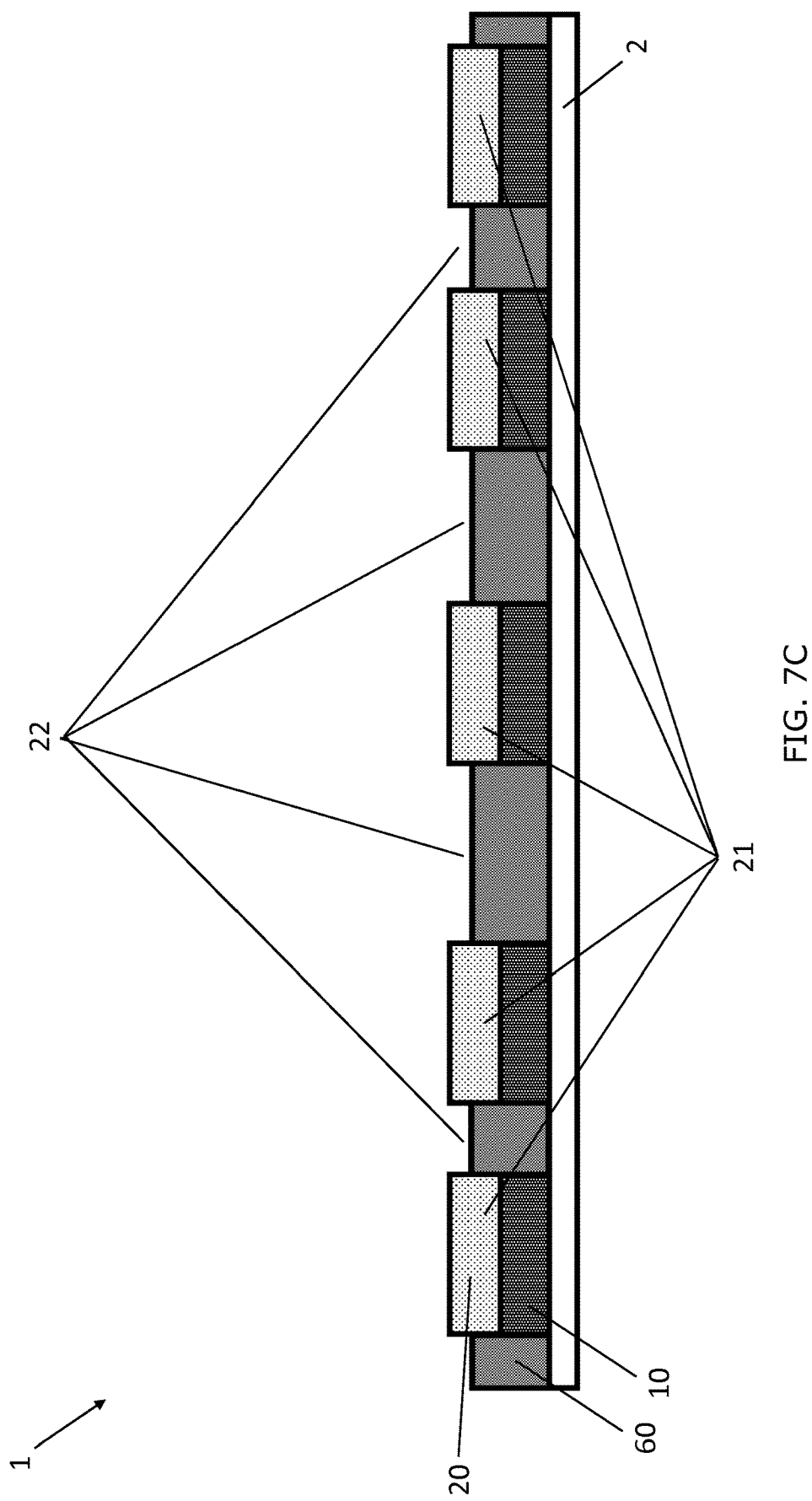

As a result shown in FIG. 7B, the cured radiation-curing coat 60 fills up the metal-free regions 12 of the first layer 10. In a further exemplary step, the second layer 20 is applied to the underlying layers as described above. Due to the metal-repellent property of the radiation-curing coat 60, the parts of the second layer 20 being coated above the metal-free regions 12 of the first layer 10 can be easily removed. As a result shown in FIG. 7C, the first pattern and the second pattern are in register. In other words, the metallic regions 21 are above the metallic regions 11, and the metal-free regions 22 are above the metal-free regions 12, without any of the metallic regions and the metal-free regions being overlapped in this manufacturing step.

Figure 7D:
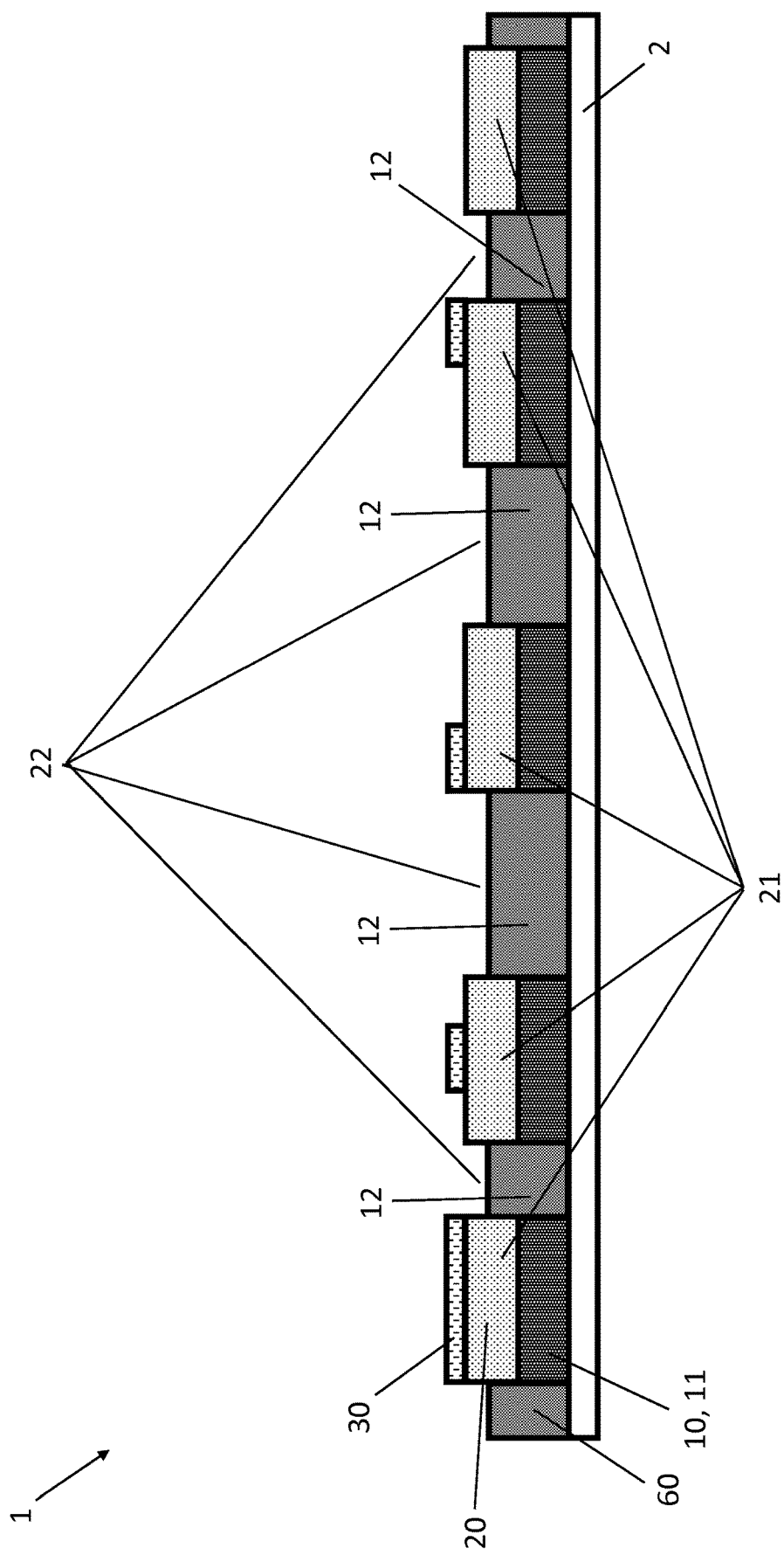
Figure 7E:
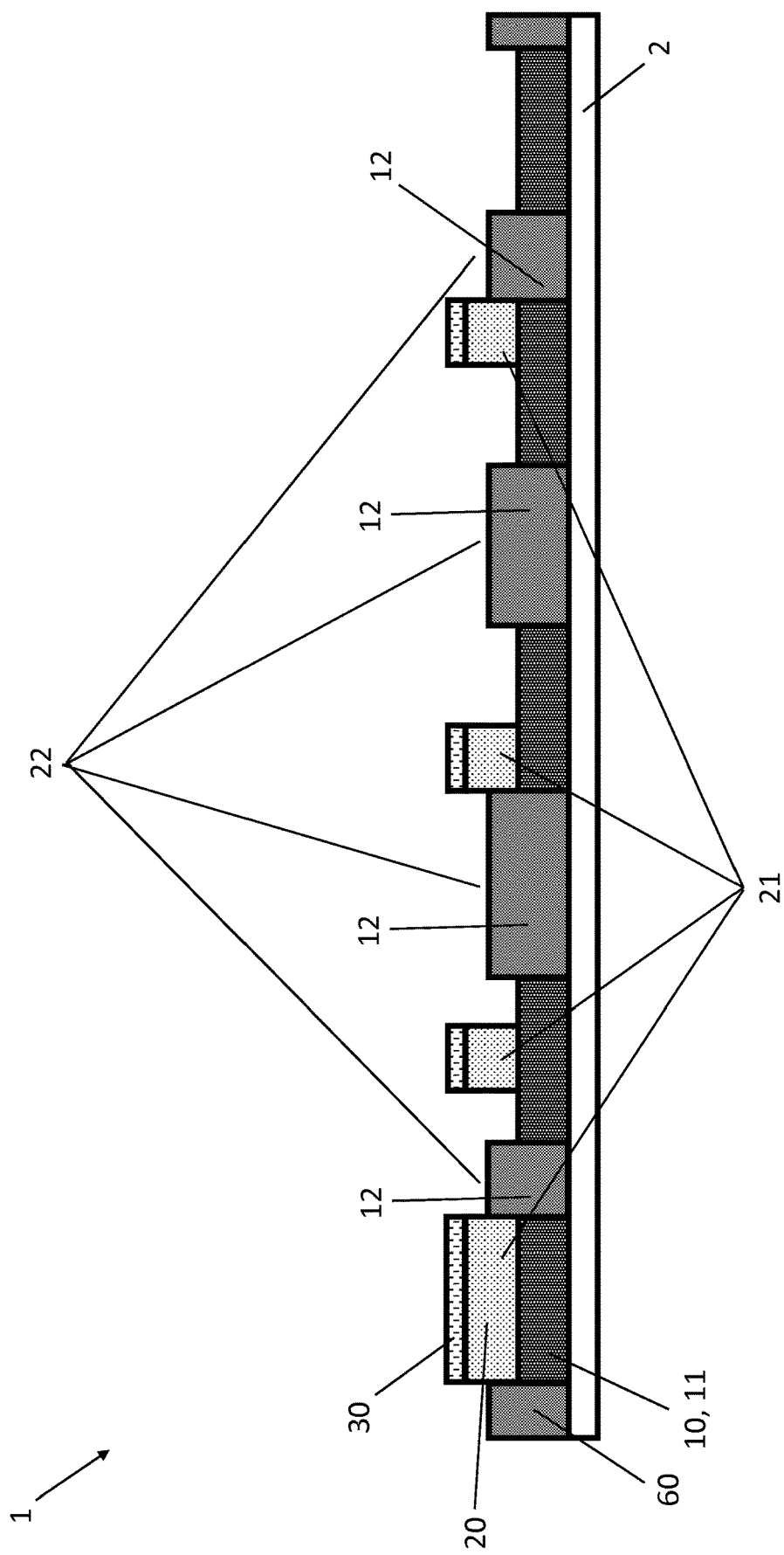
FIG. 7E is a sectional view of a schematic final structure of the security element during the manufacturing of the security element shown in FIGS. 7A to 7E according to the invention.

The following exemplary steps are depicted in FIGS. 7D and 7E, which figures show the steps of applying the transparent mask 30 to the second layer 20 and then removing the exposed part of the second layer 20 by the de-metallizing process, as set out above, thus obtaining the (completed) security element 1. As a matter of course, the various layers described above in conjunction with FIG. 2B can be applied to the security element 1 manufactured by the present manufacturing process as well.

A further variation of the above manufacturing processes is presented in FIGS. 8A to 8E.

Figure 8A:
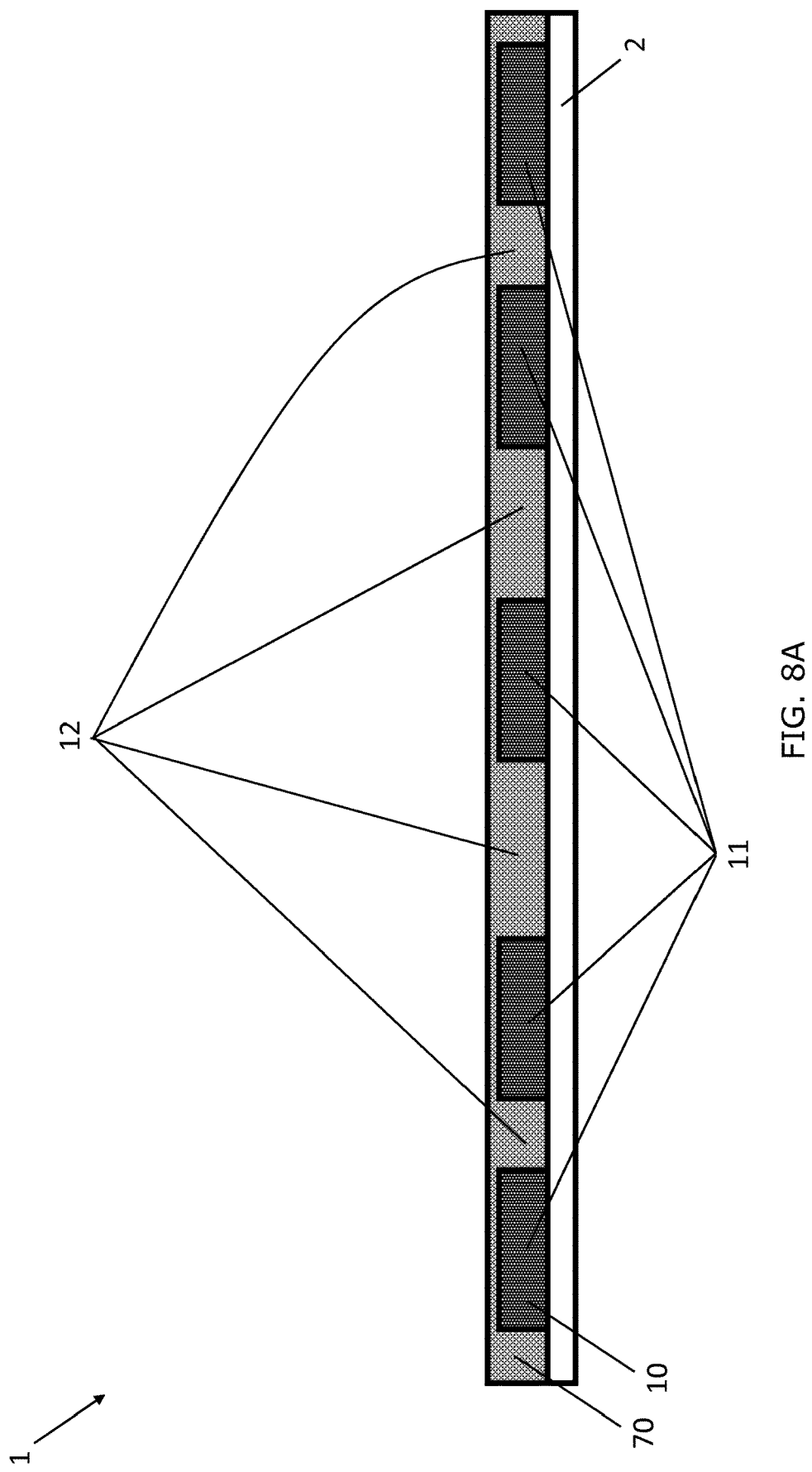
FIGS. 8A to 8D are sectional views of schematic intermediate structures of a security element during an even further manufacturing process of the security element according to the invention.
Figure 8B:
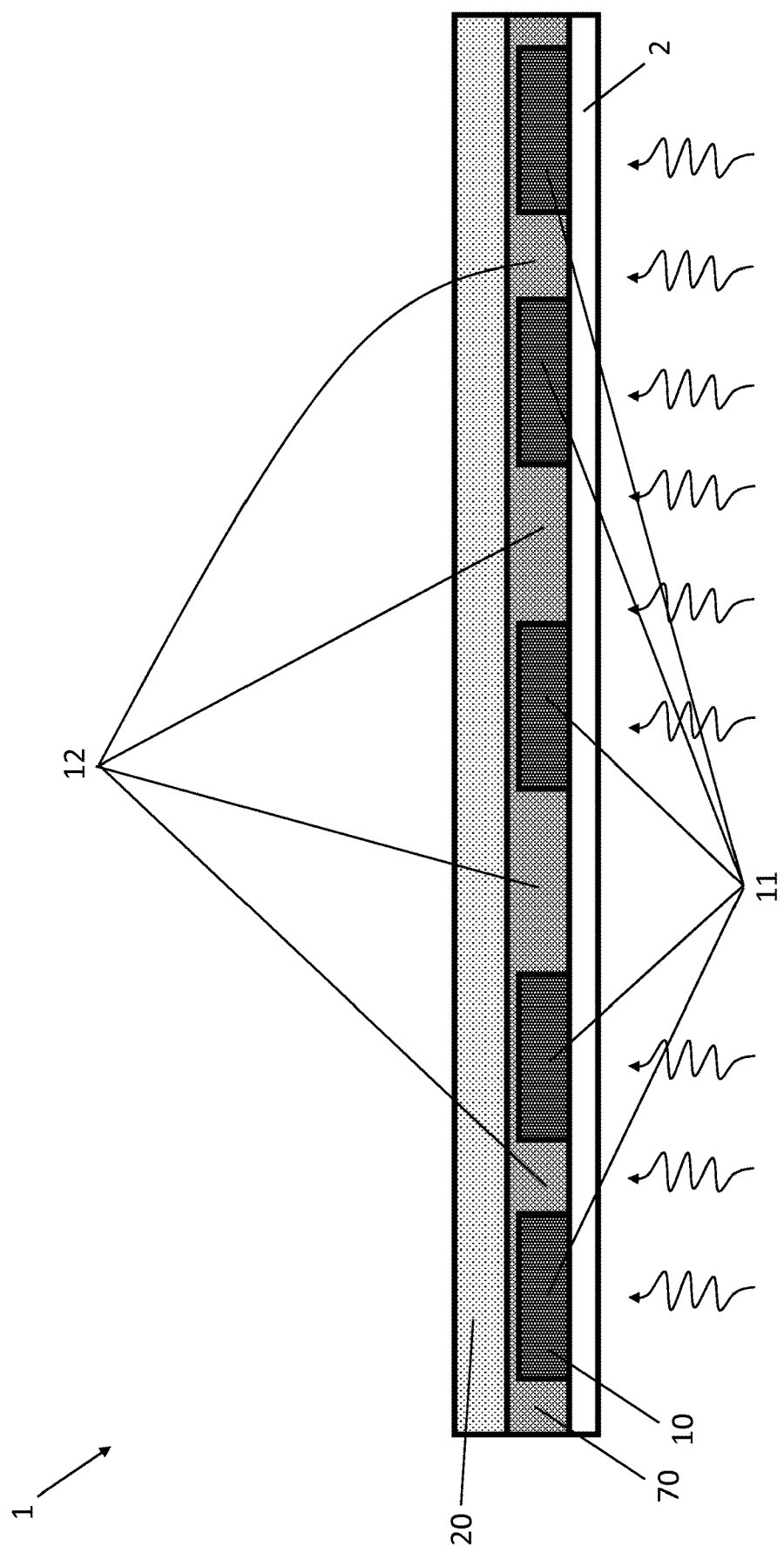
Figure 8C:
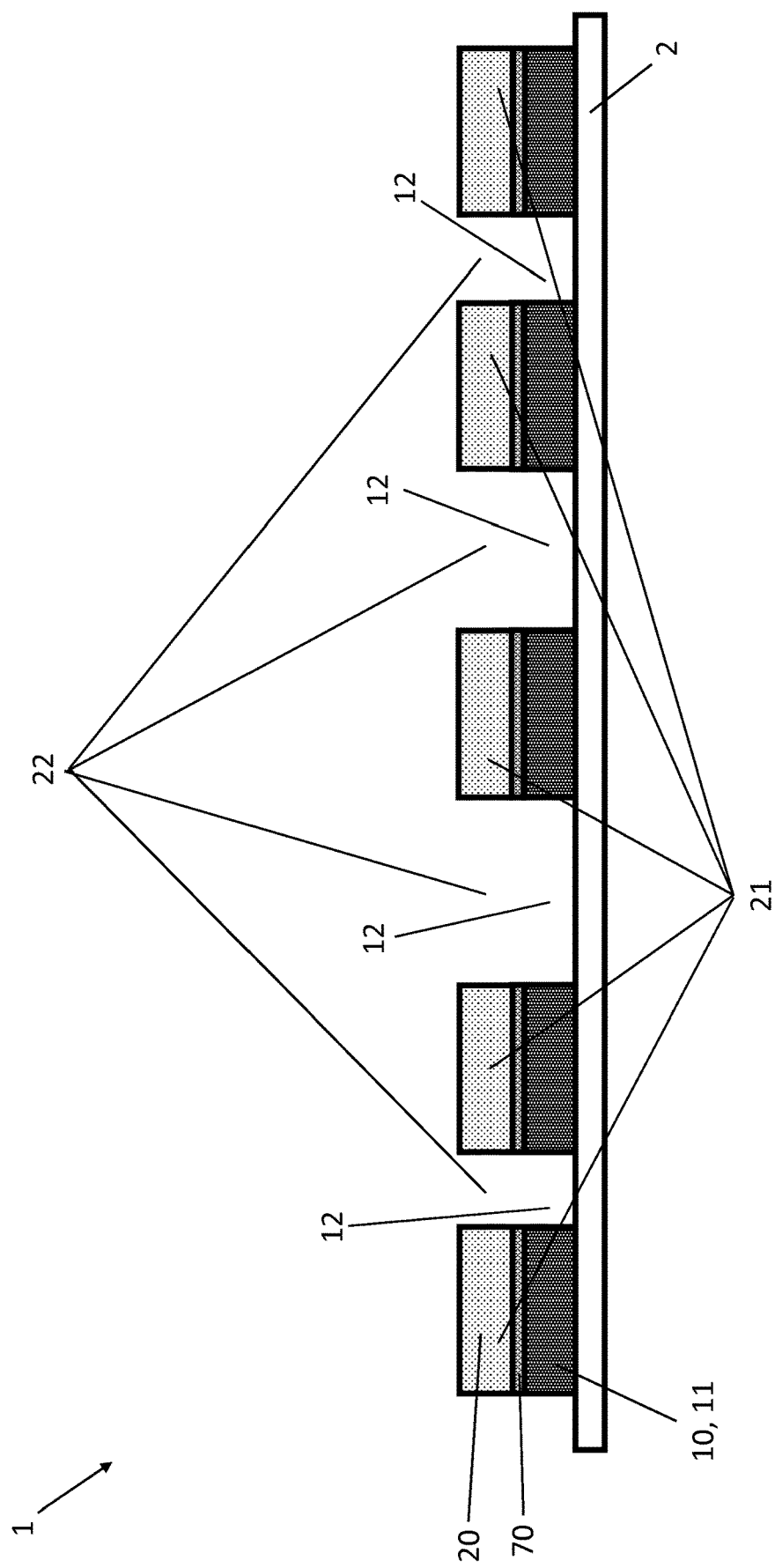

In an exemplary first step, the first layer 20 is coated on the transparent film 2 either directly or with other layers interposed therebetween. The application of the first layer 10 can be done either selectively or by using the release agent 40, as has been explained above. Subsequently, as shown in FIG. 8A, a radiation-resolvable coat 70 is applied to the intermediate security element 1. The coat 70 is resolvable, i.e. is destabilized, when being irradiated with a specific radiation, preferably UV-light, X-rays or light from the visible spectrum. When the photo-sensitive material of the radiation-resolvable coat 70 is irradiated with UV-light or the like, it changes its composition such that the irradiated material portions become soluble to a solvent, which may be water or another technical solvent like a mild water/soda solution. As an exemplary following step, the second layer 20 is coated on the existing layers in the manner as described above. Afterwards, as shown in FIG. 8B, the intermediate security element 1 is irradiated with the specific radiation, to which the radiation-resolvable coat 70 is susceptible so as to dissolve, using the first layer 10, specifically the metallic regions 11 thereof, as a mask. As shown in FIG. 8B, the source of radiation is below the intermediate security element 1 so that the radiation is emitted substantially in the first direction. The radiation-resolvable coat 70 being applied to the metal-free regions 12 of the first layer 10 is directly exposed to the radiation, thus dissolving, while the radiation-resolvable coat 70 being hidden from the radiation behind the metallic regions 11 of the first layer 10 remains unchanged. As a consequence, the parts of the second layer 20 adhering to the dissolved radiation-resolvable coat 70 are removed together therewith, while the parts of the second layer 20 being bound to the radiation-resolvable coat 70 being protected from radiation by the metallic regions 11 remain in register with the metallic regions 11. The irradiation result is depicted by FIG. 8C, where the metallic regions 21 are above the metallic regions 11, and the metal-free regions 22 are above the metal-free regions 12, without any of the metallic regions and the metal-free regions being overlapped in this manufacturing step.

Figure 8D:
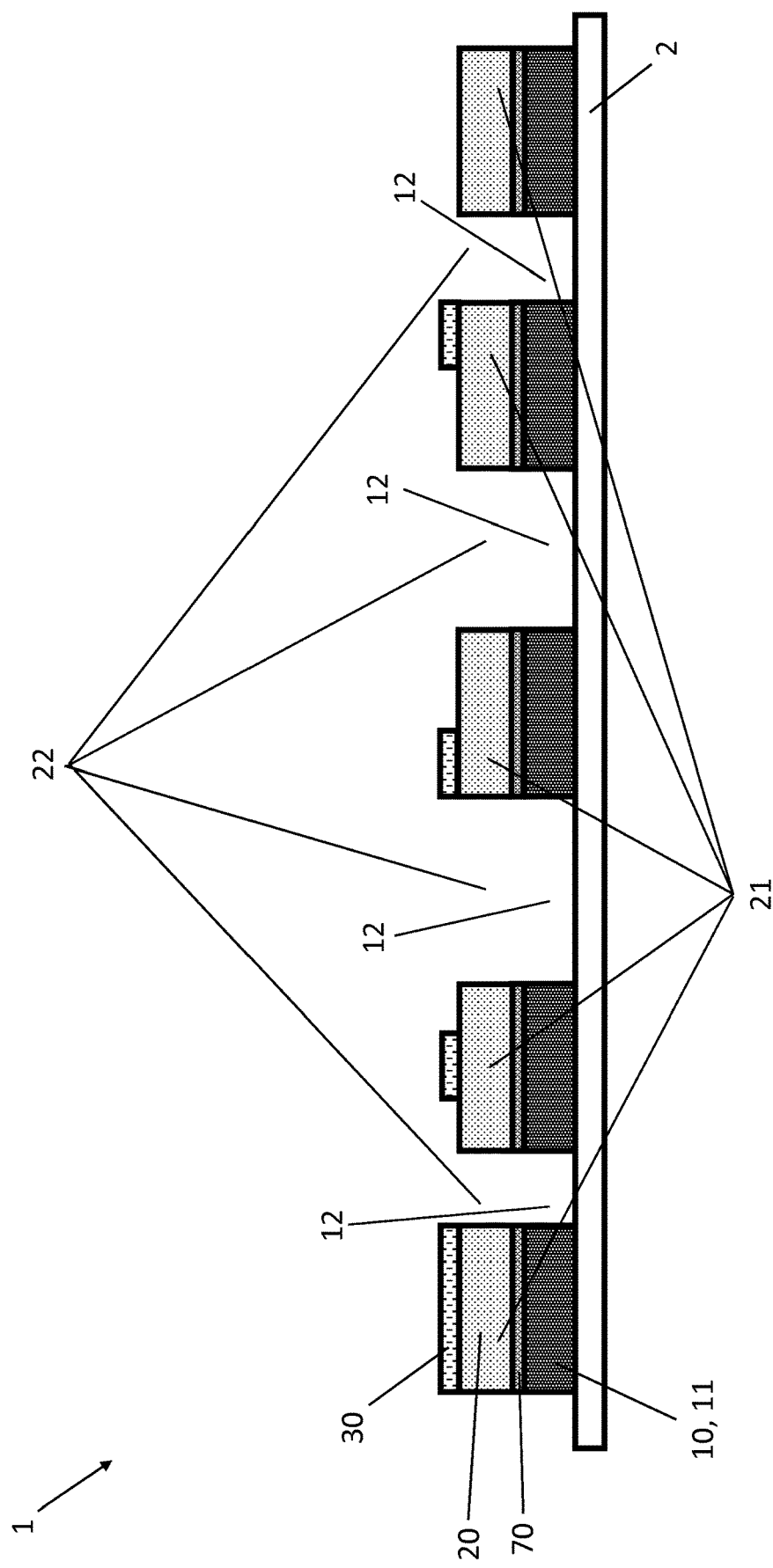
Figure 8E:
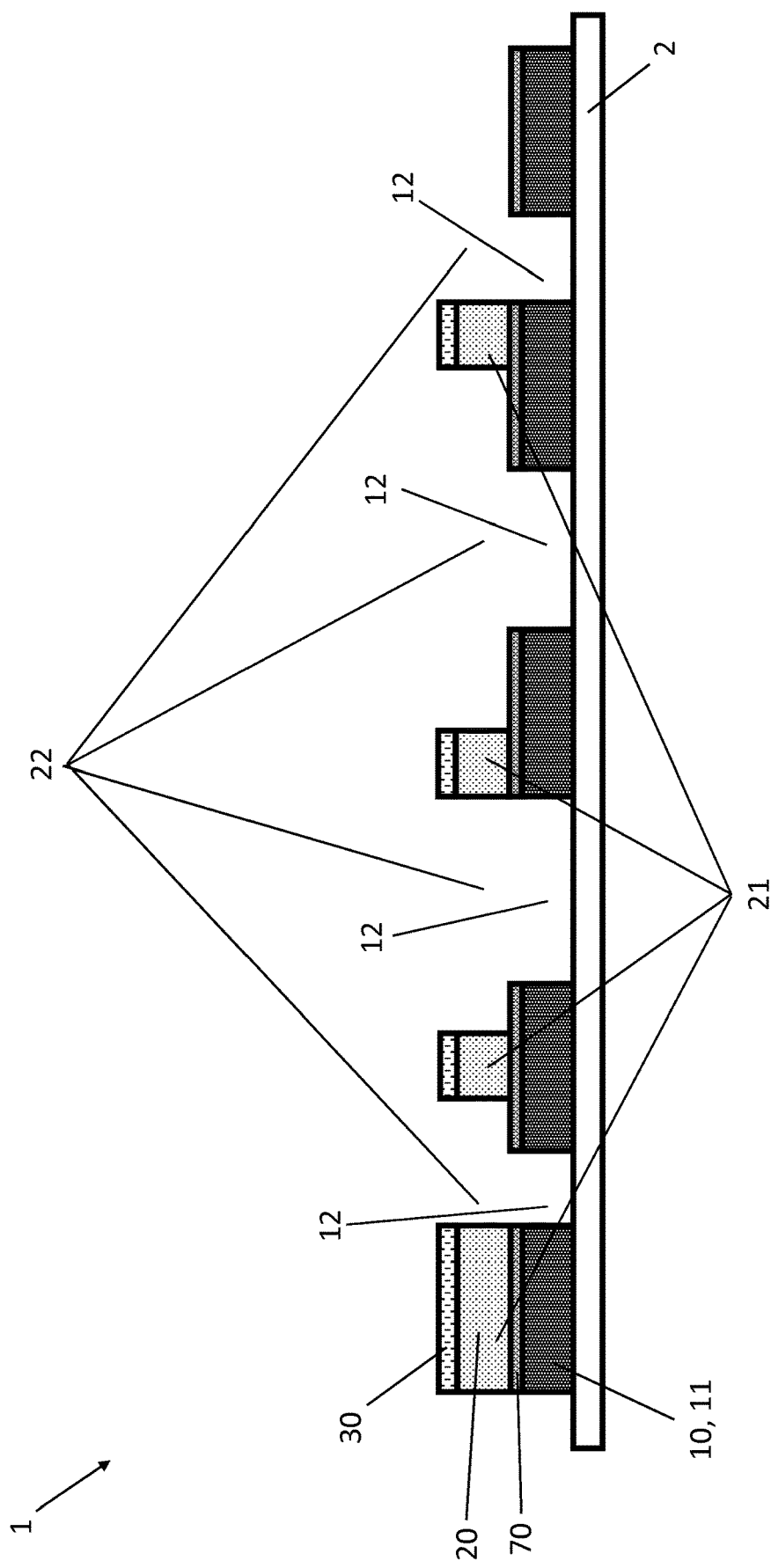
FIG. 8E is a sectional view of a schematic final structure of the security element during the manufacturing process of the security element shown in FIGS. 8A to 8D according to the invention.

The following exemplary steps are depicted in FIGS. 8D and 8E, which figures show the steps of applying the transparent mask 30 to the second layer 20 and then removing the exposed part of the second layer 20 by the de-metallizing process, as set out above, thus obtaining the (completed) security element 1. As a matter of course, the various layers described above in conjunction with FIG. 2B can be applied to the security element 1 manufactured by the present manufacturing process as well.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any modification above may be used in connection with another modification, when such a combination is technically feasible.

LIST OF REFERENCE SIGNS 1 security element
2 transparent film
3 transparent layer
4 holographic surface structure
5 color changing layer
6 magnetic material
7 insulating layer
8 clear coating
9 protective layer
10 first layer
11 metallic regions (of the first layer)
12 metal-free regions (of the first layer)
20 second layer
21 metallic regions (of the second layer)
22 metal-free regions (of the second layer)
30 transparent mask
40 release agent
50 radiation curing coat (metal repellent)
60 transparent radiation-curing coat (metal repellant)
70 radiation-resolvable coat

What is claimed is:
1. A security element, comprising:
a transparent film, a first layer including a first metal arranged over said transparent film in a first pattern, and a second layer including a second metal being a baser metal than said first metal arranged on said first layer in a second pattern, wherein each of said first and second patterns is composed of metallic regions and metal-free regions, metal-free regions of said second pattern overlap with metal-free regions of said first pattern, and metallic regions of said first pattern overlap with metal-free regions of said second pattern, wherein said second layer is arranged on said first layer such that the metallic regions of said first layer directly contact and adhere to the metallic regions of the second layer.

2. A security element according to claim 1, wherein at least one of said first and second layers has a holographic surface structure.

3. A security element according to claim 1, wherein a color changing layer covers at least parts of at least one of said first and second layers.

4. A security element according to claim 1, further comprising a magnetic material in said metallic regions of said patterns or in a separate magnetic layer, forming a machine readable information carrier.

5. A security element according to claim 1, wherein a clear coating is provided in at least a part of at least one of said first and second layers, said color changing layer, and said magnetic layer, said clear coating comprising materials having at least one of a fluorescent, a luminescent, and phosphorescent effect.

6. A security element according to claim 1, wherein at least one transparent layer is interposed between at least said metallic regions of said first layer and said transparent film.

7. A security element according to claim 6, wherein said at least one transparent layer and a side of said first layer facing said transparent layer have a holographic surface structure.

8. A security element according to claim 6, wherein said at least one transparent layer is at least one of a color changing layer, a magnetic layer, and a layer comprising at least one of a fluorescent, a luminescent, and phosphorescent effect.

9. A security element according to claim 1, wherein said element is provided with a protective layer covering at least a part of exposed outermost surface portions of at least one of said first and second layers, said clear coating, said magnetic layer, and said color changing layer.

10. A method for manufacturing a security element, the method comprising:

providing a transparent film, forming a first layer including a first metal over said transparent film having a first pattern of metallic regions and metal-free regions, forming a second layer of a second metal, which is a baser metal than said first metal on said first layer, forming a layer of a transparent mask on a part of said second layer, and removing a part of said second layer that is not protected by said transparent mask by a de-metallization process to which the second metal is more susceptible than the first metal, such that metal-free regions of said second layer overlap with said metal-free regions of said first pattern and with said metallic regions of said first pattern, and the metallic regions of said first layer directly contact and adhere to the metallic regions of the second layer.

11. A method for manufacturing a security element, the method comprising:

providing a transparent film, applying a release agent on parts of said transparent film coating said transparent film and said release agent with a first metal, removing said first metal being coated on said release agent so as to form a first layer on said transparent film having a first pattern of metallic regions and metal-free regions, coating a second metal, which is a baser metal than said first metal, over said first metal and said release agent, removing said second metal being coated on said release agent so as to form a second layer over said first layer having a second pattern of metallic regions and metal-free regions, forming a layer of a transparent mask on a part of said second layer, and removing a part of said second layer that is not protected by said transparent mask by a de-metallization process to which the second metal is more susceptible than the first metal, such that said metal-free regions of said second pattern overlap with said metal-free regions of said first pattern and with said metallic regions of said first pattern, and said second layer is arranged upon said first layer to adhere the metallic regions of said first and second layers to each other.

12. A security element, comprising:

a transparent film, a first layer including a first metal arranged over said transparent film in a first pattern, and a second layer including a second metal being a baser metal than said first metal arranged on said first layer in a second pattern, wherein each of said first and second patterns is composed of metallic regions and metal-free regions, metal-free regions of said second pattern overlap with metal-free regions of said first pattern, and metallic regions of said first pattern overlap with metal-free regions of said second pattern, wherein a color changing layer covers at least parts of at least one of said first and second layers, wherein the metallic regions of said first layer directly contact and adhere to the metallic regions of the second layer.

13. A security element, comprising:

a transparent film, a first layer including a first metal arranged over said transparent film in a first pattern, and a second layer including a second metal being a baser metal than said first metal arranged over said first layer in a second pattern, wherein each of said first and second patterns is composed of metallic regions and metal-free regions, metal-free regions of said second pattern overlap with metal-free regions of said first pattern, and metallic regions of said first pattern overlap with metal-free regions of said second pattern, wherein a clear coating is provided in at least a part of at least one of said first and second layers, a color changing layer, and a magnetic layer, said clear coating comprising materials having at least one of a fluorescent, a luminescent, and phosphorescent effect.

14. A security element, comprising:

a transparent film, a first layer including a first metal arranged over said transparent film in a first pattern, and a second layer including a second metal being a baser metal than said first metal arranged on said first layer in a second pattern, wherein each of said first and second patterns is composed of metallic regions and metal-free regions, metal-free regions of said second pattern overlap with metal-free regions of said first pattern, and metallic regions of said first pattern overlap with metal-free regions of said second pattern, wherein at least one transparent layer is interposed between at least said metallic regions of said first layer and said transparent film, wherein the metallic regions of said first layer directly contact and adhere to the metallic regions of the second layer.

15. A security element according to claim 14, wherein said at least one transparent layer and a side of said first layer facing said transparent layer have a holographic surface structure.

16. A security element according to claim 14, wherein said at least one transparent layer is at least one of a color changing layer, a magnetic layer, and a layer comprising at least one of a fluorescent, a luminescent, and phosphorescent effect.

17. A security element, comprising:

a transparent film, a first layer including a first metal arranged over said transparent film in a first pattern, and a second layer including a second metal being a baser metal than said first metal arranged on said first layer in a second pattern, wherein each of said first and second patterns is composed of metallic regions and metal-free regions, metal-free regions of said second pattern overlap with metal-free regions of said first pattern, and metallic regions of said first pattern overlap with metal-free regions of said second pattern, wherein said element is provided with a protective layer covering at least a part of exposed outermost surface portions of at least one of said first and second layers, a clear coating, a magnetic layer, and a color changing layer, wherein the metallic regions of said first layer directly contact and adhere to the metallic regions of the second layer.

\* \* \* \* \*